(12) United States Patent
Tian

(10) Patent No.: US 11,532,944 B2
(45) Date of Patent: Dec. 20, 2022

(54) CHARGING ADJUSTMENT METHOD, TERMINAL AND COMPUTER STORAGE MEDIUM

(71) Applicant: GUANGDONG OPPO MOBILE TELECOMMUNICATIONS CORP., LTD., Guangdong (CN)

(72) Inventor: Chen Tian, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 251 days.

(21) Appl. No.: 16/725,902

(22) Filed: Dec. 23, 2019

(65) Prior Publication Data

US 2020/0136416 A1   Apr. 30, 2020

Related U.S. Application Data

(63) Continuation of application No. PCT/CN2018/104338, filed on Sep. 6, 2018.

(51) Int. Cl.
*H02J 7/00* (2006.01)
*H01M 10/44* (2006.01)
*H02J 7/04* (2006.01)

(52) U.S. Cl.
CPC ............ *H02J 7/0071* (2020.01); *H01M 10/44* (2013.01); *H02J 7/007* (2013.01); *H02J 7/00714* (2020.01); *H02J 7/00308* (2020.01); *H02J 7/04* (2013.01)

(58) Field of Classification Search
CPC ........ H02J 7/0068; H02J 7/007; H02J 7/0071; H02J 7/00711; H02J 7/00712; H02J 7/00714; H02J 7/00716; H02J 7/00718; H02J 7/007182; H02J 7/007184;
(Continued)

(56) References Cited

U.S. PATENT DOCUMENTS 5,777,399 A    7/1998  Shibuya
5,818,202 A *  10/1998 Miyamoto ............ H01M 10/44
                                              320/160
6,459,239 B1   10/2002 Price
(Continued)

FOREIGN PATENT DOCUMENTS

CN     104467121 A     3/2015
CN     104810909 A     7/2015
(Continued)

OTHER PUBLICATIONS

ISR with English translation for PCT application PCT/CN2018/104338.
(Continued)

*Primary Examiner* — Zixuan Zhou
(74) *Attorney, Agent, or Firm* — Young Basile Hanlon & MacFarlane, P.C.

(57) ABSTRACT

Embodiments of the present disclosure provide a charging adjustment method, a terminal and a computer storage medium. The method includes: detecting a real-time charging current when performing charging to a battery; determining whether to perform charging adjustment according to the real-time charging current and a preset cut-off current; obtaining a target voltage when determining to perform the charging adjustment; and performing charging to the battery according to the target voltage.

13 Claims, 4 Drawing Sheets

(58) Field of Classification Search
CPC ........... H02J 7/007186; H02J 7/007188; H02J 7/00719; H02J 7/007192; H02J 7/007194
USPC ........................................................ 320/128
See application file for complete search history.

(56) References Cited

U.S. PATENT DOCUMENTS

| | | | | |
|---|---|---|---|---|
| 2011/0112782 | A1* | 5/2011 | Majima | H02J 7/0029 |
| | | | | 324/427 |
| 2012/0098481 | A1* | 4/2012 | Hunter | H02J 7/00712 |
| | | | | 703/13 |
| 2014/0085731 | A1 | 3/2014 | Farris et al. | |
| 2015/0069952 | A1* | 3/2015 | Xiang | H02J 7/0047 |
| | | | | 320/162 |
| 2015/0295441 | A1* | 10/2015 | Winger | G06F 1/266 |
| | | | | 320/107 |
| 2017/0033582 | A1* | 2/2017 | Lei | H02J 7/342 |
| 2017/0040805 | A1* | 2/2017 | Huang | H02J 7/045 |
| 2017/0133871 | A1* | 5/2017 | Liu | H02J 7/0071 |
| 2017/0207651 | A1* | 7/2017 | Geng | H01M 10/44 |
| 2018/0205234 | A1* | 7/2018 | Zhang | H02J 7/00718 |
| 2019/0054838 | A1* | 2/2019 | Stec | B60L 53/00 |
| 2019/0140458 | A1* | 5/2019 | Liu | H02J 7/04 |

FOREIGN PATENT DOCUMENTS

| | | |
|---|---|---|
| CN | 104868562 A | 8/2015 |
| CN | 104967201 A | 10/2015 |
| CN | 204696758 U | 10/2015 |
| CN | 105337368 A | 2/2016 |
| CN | 106385094 A | 2/2017 |
| CN | 106487065 A | 3/2017 |
| CN | 107516917 A | 12/2017 |
| CN | 207021751 U | 2/2018 |
| CN | 107820656 A | 3/2018 |
| EP | 3101751 A1 | 12/2016 |

OTHER PUBLICATIONS

First OA for CN application 201880016051.X dated Apr. 17, 2020 with English translation.
Third OA with English translation for CN application 201880016051.X dated Oct. 26, 2020.
Extended European Search Report for EP application 18932955.0 dated Jan. 18, 2021.
Second OA and English translation for CN application 201880016051.X dated Jul. 22, 2020.
China Office Action with English Translation for CN Application 201880016051.X dated Feb. 2, 2021. (10 pages).
Indian Examination Report for IN Application 202017001818 dated Apr. 23, 2021. (5 pages).
Communication pursuant to Article 94(3) EPC for EP Application 18932955.0 dated May 10, 2022. (4 pages).

* cited by examiner

| Difference range (mA) | Adjustment parameter (mV) |
|---|---|
| (0,200) | 20 |
| (200,400) | 40 |
| (400,600) | 60 |
| (600,800) | 80 |

US 11,532,944 B2

CHARGING ADJUSTMENT METHOD, TERMINAL AND COMPUTER STORAGE MEDIUM

CROSS-REFERENCE TO RELATED APPLICATION(S)

This application is a continuation application of International Application No. PCT/CN2018/104338, filed on Sep. 6, 2018, the entire contents of which are incorporated herein by reference.

TECHNICAL FIELD

The present disclosure relates to a field of terminal charging technologies, and more particularly, to a charging adjustment method, a terminal and a computer storage medium.

BACKGROUND

In the related art, in order to improve a charging speed of a terminal, a method for increasing a charging cut-off current through a flash fast charging (FFC) algorithm is proposed, so that a battery of the terminal can be charged to an overvoltage exceeding a calibrated rated voltage during charging, thereby eliminating a constant voltage charging process and increasing the charging speed.

However, when the terminal is in a state of large load and high power consumption, the large load consumes the charging current, resulting in that the charging current entering the battery is greatly reduced, so that a floating voltage of the battery is reduced. Therefore, the battery charged in an overvoltage charging manner may be damaged by the overvoltage, and a service time of the terminal is reduced.

SUMMARY

Embodiments of the present disclosure provide a charging adjustment method. The method includes: detecting a real-time charging current when performing charging to a battery; determining whether to perform a charging adjustment according to the real-time charging current and a preset cut-off current; obtaining a target voltage when determining to perform the charging adjustment; and performing charging to the battery according to the target voltage.

Embodiments of the present disclosure provide a terminal. The terminal includes a battery, a memory, and a processor. The memory is configured to store instructions executable by the processor. The processor is configured to run a program corresponding to the instructions by reading the instructions stored in the memory, so as to: detect a real-time charging current when performing charging to the battery; determine whether to perform a charging adjustment according to the real-time charging current and a preset cut-off current; obtain a target voltage when the charging adjustment is determined to be performed; and perform charging to the battery according to the target voltage.

Embodiments of the present disclosure provide a computer readable storage medium having a program stored thereon. The program is applied to a terminal, and when the program is executed by a processor, the charging adjustment method as described above is implemented.

DETAILED DESCRIPTION

Figure 1:
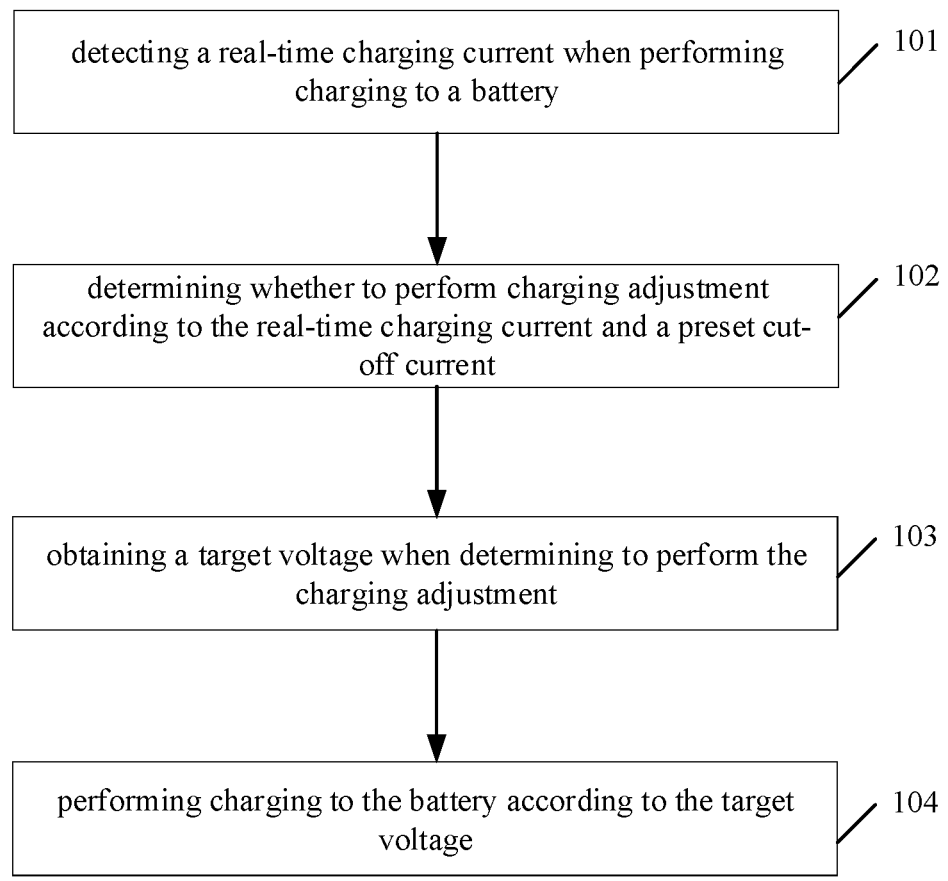
FIG. 1 is a flowchart of an implementation of a charging adjustment method according to an embodiment of the present disclosure.

The technical solution in embodiments of the present disclosure will be described clearly and completely below in combination with the attached drawings in embodiments of the present disclosure. It could be understood that the specific embodiments described herein are intended only to interpret the relevant disclosure and not to limit the present disclosure. It should also be noted that, for the purpose of description, only the relevant parts of the present disclosure are shown in the attached drawing.

When charging the battery of the terminal, the conventional charging methods mainly include trickle charging, constant current charging, and constant voltage charging. Accordingly, the entire charging cycle of the terminal may include three stages of trickle charging, fast charging, and continuous charging. After two stages of fast charging and continuous charging, although an electric quantity of the terminal is displayed as 100%, in fact, the battery does not really reach a saturation state, and the remaining capacity can only be supplemented by small pulsating current, which usually takes 30-40 minutes. After all three stages are completed, the battery can truly reach a good state of saturation.

Moreover, fast charging can charge the battery to 100% rapidly, but continuous charging is required to enable the battery to be fully charged. The continuous charging can gradually reduce the charging current when the battery is about to be fully charged, to ensure that the battery is fully charged. The trickle charging is small current charging after the battery is fully charged, which keeps electrons flowing and prolongs the service life of the electrons. Through the above three charging stages, it can be ensured that when the terminal is charged, overcurrent is prevented when the battery has a low electric quantity, and overvoltage does not occur when the battery has a high electric quantity.

Furthermore, during the entire charging cycle of the terminal, the longer the charging duration of the constant current with large current, the faster the charging speed. In order to increase the charging speed, it is necessary to increase the charging duration of the constant current charging and reduce the charging duration of the constant voltage charging. However, in order to prevent the occurrence of overvoltage of the battery, there is a long-term constant voltage stage, and the charging duration is reduced.

By increasing the charging cut-off current according to the FFC algorithm, the battery of the terminal can be charged by overvoltage charging with a voltage exceeding the calibrated rated voltage during charging, thereby eliminating the process of constant voltage charging, as long as the floating voltage during the charging process is controlled to prevent the occurrence of overvoltage of the battery.

The technical solutions in the embodiments of the present disclosure will be clearly and completely described in the following with reference to the accompanying drawings in the embodiments.

Embodiment 1

This embodiment of the present disclosure provides a charging adjustment method. FIG. 1 is a flowchart of an implementation of a charging adjustment method according to an embodiment of the present disclosure. As illustrated in FIG. 1, in the embodiments of the present disclosure, the charging adjustment method implemented by the terminal may include following blocks.

At block 101, a real-time charging current is detected when charging is performed to a battery.

In embodiments of the present disclosure, for example, when the terminal performs FFC, the real-time charging current may be detected first. The real-time charging current may be a real-time current flowing into a battery disposed in the terminal.

It should be noted that, in embodiments of the present disclosure, the terminal may be any terminal having a communication and storage function, and the terminal is provided with a battery. For example, the terminal may be a tablet computer, a mobile phone, an e-reader, a remote controller, a personal computer (PC), a laptop, an on-board equipment, an Internet TV, a wearable device and the like.

Moreover, in embodiments of the present disclosure, the FFC is a fast charging algorithm. Specifically, the terminal may increase the charging cut-off current during charging, such that the battery of the terminal can be charged by overvoltage charging with a voltage exceeding the calibrated rated voltage, thereby not performing the process of constant voltage charging during the charging, i.e., eliminating the process of constant voltage charging. It should be noted that, during the FFC of the terminal, it is required to control the floating voltage to prevent the occurrence of overvoltage of the true voltage of the battery.

Furthermore, in embodiments of the present disclosure, before detecting the real-time charging current when performing the charging, the terminal may first establish a connection with a charging device.

It should be noted that, in embodiments of the present disclosure, when the terminal is charged, the terminal may be in a state of large load and high power. For example, the terminal plays the video while charging, or simultaneously runs the game software while charging. In a scenario with a large load, a part of the current connected to the battery of the terminal is occupied by the large load, that is, the terminal extracts the current entering the battery when the terminal is used under a large load, thereby reducing the real-time charging current entering the battery.

Figure 2:
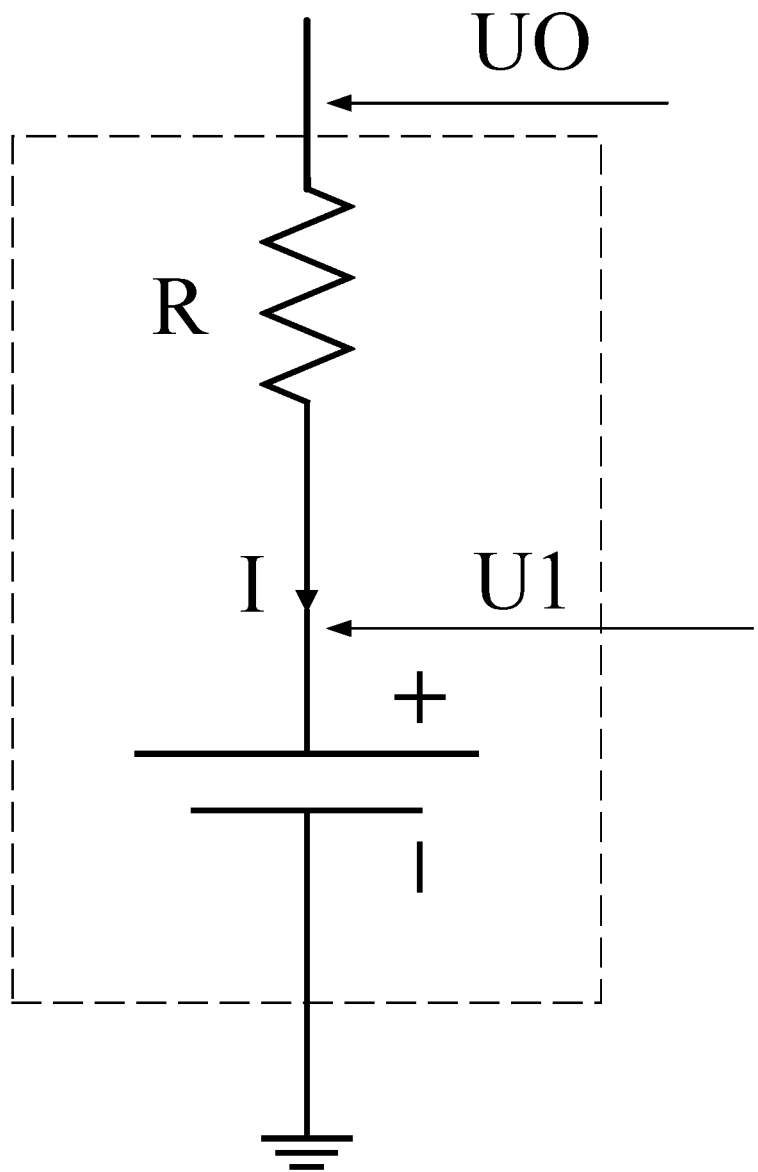
FIG. 2 is a circuit diagram of charging a battery of a terminal according to an embodiment of the present disclosure.

FIG. 2 is a circuit diagram of charging a battery of a terminal in an embodiment of the present disclosure. As illustrated in FIG. 2, the internal resistance of the battery is R, the charging current is I, and the real voltage U1 of the battery is not the open-circuit voltage U0 of the battery. As can be seen from FIG. 2, a sum of the floating voltage corresponding to R and the real voltage U1 of the battery is the open-circuit voltage U0. The open-circuit voltage U0 may be obtained according to the formula (1).

$$U0 = I*R + U1 \quad (1)$$

Further, in embodiments of the present disclosure, when the terminal performs the FFC, the terminal may detect the current input into the battery in real time, that is, detect the real-time charging current, so that the charging mode may be further adjusted according to the real-time charging current, thereby avoiding the overvoltage damage of the battery caused by charging in the overvoltage charging mode based on the above FFC, when the real-time charging current decreases due to the current occupation of the large load.

At block 102, it is determined whether to perform a charging adjustment according to the real-time charging current and a preset cut-off current.

In embodiments of the present disclosure, after detecting the real-time charging current, the terminal may further determine whether to perform a charging adjustment according to the real-time charging current and a preset cut-off current.

It should be noted that, in embodiments of the present disclosure, after obtaining the real-time charging current, the terminal may compare the real-time charging current with the preset cut-off current, so as to further determine whether to perform a charging adjustment according to the comparison result.

Furthermore, in embodiments of the present disclosure, after the terminal compares the real-time charging current with the preset cut-off current, and obtains the comparison result, if the comparison result is that the preset cut-off current is greater than the real-time charging current, then it can be considered that a part of the current flowing into the battery of the terminal is occupied by a large load, and in order to avoid overvoltage damage of the battery, it is necessary to adjust the charging mode.

Correspondingly, in embodiments of the present disclosure, after the terminal compares the real-time charging current with the preset cut-off current, and obtains the comparison result, if the comparison result is that the preset off current is less than or equal to the real-time charging current, it can be considered that the current flowing into the battery of the terminal is the above-mentioned real-time charging current, and there is no case where the large load occupies the current, thus it is unnecessary to adjust the charging mode.

Further, in embodiments of the present disclosure, the terminal may preset a current upper limit, i.e., the preset cut-off current.

At block 103, a target voltage is obtained, when it is determined to perform a charging adjustment.

In embodiments of the present disclosure, after determining whether to perform the charging adjustment according to the real-time charging current and the preset cut-off current, the terminal may further obtain the target voltage when determining to perform the charging adjustment.

It should be noted that the target voltage may be used to adjust the charging mode of the terminal.

Further, in embodiments of the present disclosure, after determining to perform the charging adjustment, the terminal may further obtain the target voltage according to the real-time charging current and the preset cut-off current.

It should be noted that, in embodiments of the present disclosure, the target voltage is corresponding to the real-time charging current, that is, the terminal may perform real-time adjustment on the target voltage according to the real-time charging current, so that the charging mode may be further adjusted, thereby avoiding the overvoltage damage of the battery caused by the overvoltage charging method according to the above-mentioned FFC, when the real-time charging current decreases due to the current occupation of the large load.

Further, in embodiments of the present disclosure, after obtaining the real-time charging current, the terminal may compare the real-time charging current with the preset cut-off current, so as to further determine the target voltage according to the comparison result.

It should be noted that, in embodiments of the present disclosure, the terminal may perform real-time adjustment on the preset cut-off voltage according to the real-time charging current to obtain an adjusted cut-off voltage, i.e., the target voltage.

At block 104, charging is performed to the battery according to the target voltage.

In embodiments of the present disclosure, after the terminal performs the charging adjustment according to the real-time charging current and the preset cut-off voltage current, and determines the target voltage, the terminal may charge the battery according to the target voltage.

It should be noted that, in embodiments of the present disclosure, the target voltage is obtained by the terminal through adjusting the preset cut-off voltage according to the real-time charging current, and therefore, the terminal charging the battery of the terminal according to the target voltage may effectively adjust the charging mode, to achieve the requirement of adjusting the battery charging according to the above real-time charging current.

Further, in an embodiment of the present disclosure, the terminal may perform charging according to the target voltage as follows. The terminal performs the constant voltage charging on the battery according to the target voltage.

It should be noted that, in embodiments of the present disclosure, after the terminal is charged according to the target voltage, the method for performing charging adjustment by the terminal may further include the following acts.

At block 105, real-time detection of the charging current is continued to reobtain the real-time charging current.

In embodiments of the present disclosure, after the terminal charges the battery according to the target voltage, the terminal may continue to perform real-time detection of the charging current, so that the real-time charging current of the battery may be reobtained.

It should be noted that, in embodiments of the present disclosure, the terminal may continuously detect the charging current of the battery in real time, so that a new real-time charging current may be continuously obtained to continue the charging adjustment according to the real-time charging current at the present moment.

At block 106, the charging adjustment is performed again according to the real-time charging current until the charging is over.

In embodiments of the present disclosure, after the terminal continuously performs the real-time detection of the charging current and reobtains the real-time charging current of the battery, the charging adjustment may be performed again according to the real-time charging current until the charging is over.

It should be noted that, in embodiments of the present disclosure, the terminal may also detect the electric quantity in real time to obtain real-time electric quantity, and when the real-time electric quantity is in a saturation state, the charging may be ended.

Further, in embodiments of the present disclosure, the terminal may continuously adjust the charging mode according to the real-time charging current, and the real-time charging current at different moments may correspond to different target voltages, so that the terminal may be charged at a constant voltage through a corresponding target voltage at different moments to avoid overvoltage damage of the battery when the current occupation of the large load results in decreasing of the real-time charging current.

With the charging adjustment method according to the embodiments of the present disclosure, when charging is performed to the battery of the terminal, the real-time charging current is detected; it is determined whether to perform charging adjustment according to the real-time charging current and the preset cut-off current; and when it is determined that the charging adjustment is required to be performed, the target voltage is obtained, and charging is performed to the battery according to the target voltage. Therefore, in embodiments of the present disclosure, when the terminal is in the state of large load and high power consumption, the terminal is charged by the FFC and detects the real-time charging current, and adjusts the charging mode according to the real-time charging current. Specifically, the terminal may obtain the target voltage for charging adjustment according to the real-time charging current, and then perform charging according to the target voltage, thereby effectively solving the overvoltage damage of the battery when the terminal is in the state of large load and high power consumption, and increasing the service time of the terminal.

Embodiment 2

Based on the Embodiment 1, in this embodiment of the present disclosure, the method for acquiring the target voltage by the terminal may include the following acts.

First, a difference calculation is performed on the preset cut-off current and the real-time charging current to obtain a difference result.

In embodiments of the present disclosure, after determining whether to perform the charging adjustment according to the real-time charging current and the preset cut-off current, if the terminal determines to perform the charging adjustment, the terminal may perform the difference calculation on the preset cut-off current and the real-time charging current, and obtain the difference result between the two.

It should be noted that, in embodiments of the present disclosure, in a scenario with a large load, a part of the current connected to the battery of the terminal is occupied by the large load, that is, the terminal extracts the current entering the battery when the terminal is used under a large load, so that the real-time charging current entering into the battery diminishes. Therefore, the difference result can be used to represent the degree when the real-time charging current is less than the preset cut-off current.

Next, the target voltage is determined according to the difference result and a preset difference range.

In embodiments of the present disclosure, after the terminal performs the difference calculation on the preset cut-off current and the real-time charging current to obtain the difference result between the two, the terminal may further determine the target voltage according to the difference result and the preset difference range.

It should be noted that, in embodiments of the present disclosure, the terminal may compare the difference result and the preset difference range, and when the difference result belongs to different preset difference ranges, different target voltages may be determined accordingly.

Further, in embodiments of the present disclosure, the terminal may preset different difference ranges, i.e., the above preset difference ranges, to adjust different difference results to different degrees, thereby obtaining different target voltages.

Further, in embodiments of the present disclosure, the terminal may determine the target voltage according to the difference result and the preset difference range as follows.

First, a voltage adjustment parameter is determined according to the difference result and the preset difference range.

In embodiments of the present disclosure, after the terminal performs the difference calculation on the preset cut-off current and the real-time charging current to obtain the difference result between the two, the terminal may determine the voltage adjustment parameter according to the difference result and the preset difference range.

It should be noted that, in embodiments of the present disclosure, the terminal may compare the difference result and the preset difference range, and when the difference result belongs to different preset difference ranges, the terminal may determine different voltage adjustment parameters correspondingly to further determine different target voltages.

Further, in embodiments of the present disclosure, the terminal may preset different difference ranges, i.e., the preset difference ranges, to adjust different difference results to different degrees, thereby obtaining different voltage adjustment parameters to further determine different target voltages.

It should be noted that, in embodiments of the present disclosure, when determining the voltage adjustment parameter by the terminal according to the difference result and the preset difference range, the terminal may preset a correspondence relationship between differences and adjustment parameters, and further determine the voltage adjustment parameter according to the correspondence relationship between differences and adjustment parameters.

Figures 3, 4:
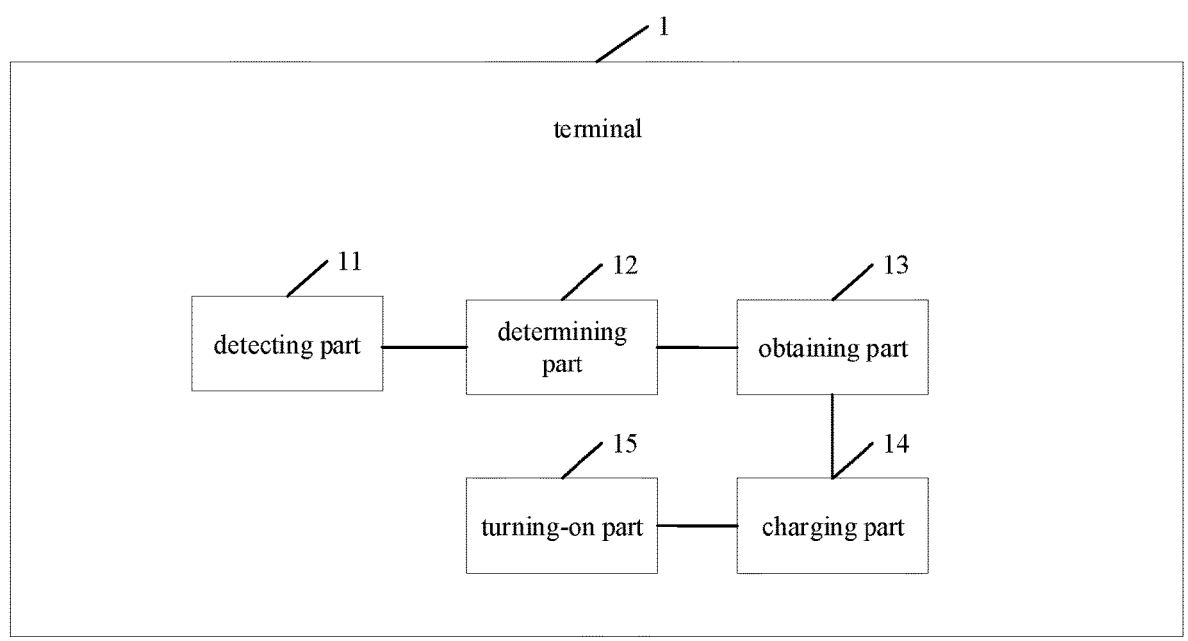
FIG. 3 is a schematic diagram of a correspondence relationship between difference values and adjustment parameters according to an embodiment of the present disclosure.
FIG. 4 is a block diagram of a terminal according to an embodiment of the present disclosure.

FIG. 3 is a schematic diagram of a correspondence relationship between difference values and adjustment parameters according to an embodiment of the present disclosure. As illustrated in FIG. 3, different adjustment parameters are corresponding to different difference ranges. For example, when it is determined that the difference between the real-time charging voltage and the preset cut-off voltage is 120 mA, the voltage adjustment parameter can be correspondingly determined as 20 mV.

After the voltage adjustment parameter is determined, the target voltage is determined according to the preset cut-off voltage and the voltage adjustment parameter.

In embodiments of the present disclosure, after determining the voltage adjustment parameter according to the difference result and the preset difference range, the terminal may determine the target voltage according to the preset cut-off voltage and the voltage adjustment parameter.

It should be noted that, in embodiments of the present disclosure, after determining the voltage adjustment parameter, the terminal may adjust the preset cut-off voltage according to the voltage adjustment parameter to obtain the target voltage, thereby avoiding the overvoltage damage of the terminal caused by charging in the overvoltage charging mode based on the FFC, when the current occupation of the large load causes the real-time charging current to diminish.

With the charging adjustment method according to embodiments of the present disclosure, when charging is performed to the battery of the terminal, the real-time charging current is detected; it is determined whether to perform charging adjustment according to the real-time charging current and the preset cut-off current; and when it is determined that a charging adjustment is required to be performed, the target voltage is obtained, and charging is performed according to the target voltage. Therefore, in embodiments of the present disclosure, when the terminal is in a state of large load and high power consumption, the terminal is charged by the FFC and detects the real-time charging current, and adjusts the charging mode according to the real-time charging current. Specifically, the terminal can obtain the target voltage for charging adjustment according to the real-time charging current, and then perform charging according to the target voltage, thereby effectively solving the overvoltage damage of the battery when the terminal is in a state of large load and high power consumption, and increasing the service time of the terminal.

Embodiment 3

In this embodiment of the present disclosure, based on the above Embodiment 2, after the terminal performs the difference calculation on the preset cut-off current and the real-time charging current to obtain the difference result, the charging adjustment method performed by the terminal may also include the following acts.

In embodiments of the present disclosure, after the terminal performs the difference calculation on the preset cut-off current and the real-time charging current to obtain the difference result between the two, if the difference result is greater than a preset difference threshold, the terminal may determine the target voltage according to a preset standard charging mode.

It should be noted that, in embodiments of the present disclosure, the terminal may preset a difference upper limit value, that is, the preset difference threshold, so that the charging mode of the battery can be switched.

Further, in embodiments of the present disclosure, after determining the difference result, the terminal may compare the difference result with the preset difference threshold to further determine whether to switch the charging mode according to the comparison result.

Further, in embodiments of the present disclosure, the preset difference threshold is used to determine whether to stop the FFC and switch to another charging mode.

It should be noted that, in embodiments of the present disclosure, the preset standard charging mode may be a constant voltage charging mode, that is, constant voltage charging with a fixed rated voltage.

Further, in embodiments of the present disclosure, the terminal may acquire the cut-off voltage corresponding to the preset standard charging mode, and determine the cut-off voltage as the above target voltage.

With the charging adjustment method according to embodiments of the present disclosure, when charging is performed to the battery of the terminal, the real-time charging current is detected; it is determined whether to perform charging adjustment according to the real-time charging current and the preset cut-off current; and when it is determined that a charging adjustment is required to be performed, the target voltage is obtained, and charging is performed according to the target voltage. Therefore, in embodiments of the present disclosure, when the terminal is in a state of large load and high power consumption, the terminal is charged by the FFC and detects the real-time charging current, and adjusts the charging mode according to the real-time charging current. Specifically, the terminal may obtain the target voltage for charging adjustment according to the real-time charging current, and then perform charging according to the target voltage, thereby effectively solving the overvoltage damage of the battery when the terminal is in a state of large load and high power consumption, and increasing the service time of the terminal.

Embodiment 4

Based on the same inventive concept of Embodiments 1 to 3, FIG. 4 is a block diagram of a terminal according to an embodiment of the present disclosure. As illustrated in FIG. 4, a terminal 1 according to the embodiment of the present disclosure may include a detecting part 11, a determining part 12, an obtaining part 13, a charging part 14, and a turning-on part 15.

The detecting part 11 is configured to detect a real-time charging current when performing charging to the battery.

The determining part 12 is configured to determine whether to adjust the charging current according to the real-time charging current and a preset cut-off current, after the detecting part 11 detects the real-time charging current.

The obtaining part 13 is configured to obtain a target voltage when the determining part 12 determines to perform the charging adjustment after determining whether to adjust the charging current according to the real-time charging current and the preset cut-off current.

The charging part 14 is configured to perform charging according to the target voltage, after the obtaining part 13 obtains the target voltage.

Furthermore, in embodiments of the present disclosure, the determining part 12 is configured to determine to perform the charging adjustment when the preset cut-off current is greater than the real-time charging current, and determine not to perform the charging adjustment when the preset cut-off current is less than or equal to the real-time charging current.

Furthermore, in embodiments of the present disclosure, the obtaining part 13 is configured to adjust a preset cut-off voltage according to the real-time charging current, to obtain the target voltage.

Furthermore, in embodiments of the present disclosure, the obtaining part 13 is configured to perform a difference calculation on the preset cut-off current and the real-time charging current to obtain a difference result; and determine the target voltage according to the difference result and a preset difference range.

Furthermore, in embodiments of the present disclosure, the obtaining part 13 is configured to determine a voltage adjustment parameter according to the difference result and the preset difference range, and determine the target voltage according to the preset cut-off voltage and the voltage adjustment parameter.

Furthermore, in embodiments of the present disclosure, after performing the difference calculation on the preset cut-off current and the real-time charging current to obtain the difference result, the obtaining part 13 is further configured to determine the target voltage according to a preset standard charging mode when the difference result is greater than a preset difference threshold. The preset standard charging mode is a charging mode in which constant voltage charging is performed with a fixed rated voltage, and the target voltage is the rated voltage.

Furthermore, in embodiments of the present disclosure, the detecting part 11 is further configured to continue to detect the charging current in real time after performing charging according to the target voltage, to reobtain the real-time charging current.

The charging part 14 is further configured to perform the charging adjustment again according to the real-time charging current until the charging is over.

Further, in embodiments of the present disclosure, the turning-on part 15 is configured to establish a connection with a charging device and turn on the FFC function.

Figure 5:
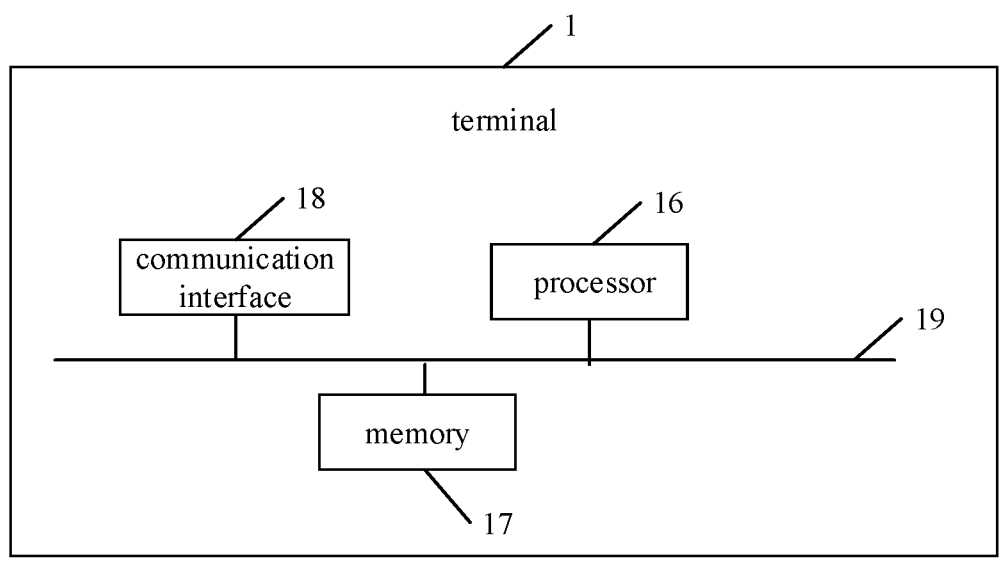
FIG. 5 is another block diagram of a terminal according to an embodiment of the present disclosure.

FIG. 5 is another block diagram of a terminal according to an embodiment of the present disclosure. As illustrated in FIG. 5, the terminal 1 according to embodiments of the present disclosure may include a processor 16, and a memory 17 storing instructions executable by the processor 16. Alternatively, the terminal 1 may further include a communication interface 18, and a bus 19 for connecting the processor 16, the memory 17, and the communication interface 18.

In embodiments of the present disclosure, the processor 16 may be at least one of an Application Specific Integrated Circuit (ASIC), a Digital Signal Processor (DSP), a Digital Signal Processing Device (DSPD), a Programmable Logic Device (PLD), a Field Programmable Gate Array (FPGA), a Central Processing Unit (CPU), a controller, a microcontroller, and a microprocessor. It is to be understood that, for different devices, the electronic elements for implementing the above-mentioned functions of the processor may be different, which is not specifically limited in the embodiments of the present disclosure. The terminal 1 may also include a memory 17 that may be coupled to the processor 16, wherein the memory 17 is configured to store executable program codes including computer operating instructions. The memory 17 may include high speed RAM memory, and may also include a non-volatile memory, such as at least two disk memories.

In the embodiments of the present disclosure, the bus 19 is used to connect the communication interface 18, the processor 16 and the memory 17, and used for mutual communication among these elements.

In embodiments of the present disclosure, the memory 17 is used to store instructions and data.

Further, in embodiments of the present disclosure, the processor 16 is configured to detect a real-time charging current when performing FFC, and determine whether to perform charging adjustment according to the real-time charging current and a preset off current; when determining to perform the charging adjustment, obtain a target voltage; and perform charging according to the target voltage.

In practical applications, the memory 17 may be a volatile memory, such as a random access memory (RAM); or a non-volatile memory, such as a read-only memory (ROM), a flash memory, a hard disk drive (HDD) or a solid-state drive (SSD); or the combination of the above memories. The memory 17 provides instructions and data to the processor 16.

In addition, respective functional units in respective embodiments of the present disclosure may be integrated in one processing module, or may be presented as physically separated units, or may be implemented as two or more unites integrated in one module. The above integrated module may be implemented in hardware or as a software functional module.

When the integrated module is implemented as a software function module and is sold or used as a standalone product, it may be stored in a computer readable storage medium. Based on such understanding, the technical solution of the embodiment or the part that contributes to the prior art, or all or part of the technical solution may be embodied in the form of a software product stored in a storage medium, which includes a plurality of instructions for causing a computer device (which may be a personal computer, a server, or a network device) or a processor to perform all or part of the steps of the method according to the present embodiment. The above storage medium includes a USB, a mobile hard disk drive, a read only memory (ROM), a random access memory (RAM), a magnetic disk, or an optical disk, and any medium which can store program codes.

With the terminal according to the embodiments of the present disclosure, when the terminal performs the FFC, a real-time charging current is detected; it is determined whether to perform charging adjustment according to the real-time charging current and a preset cut-off current; and when it is determined that the charging adjustment is required to be performed, a target voltage is obtained, and charging is performed according to the target voltage. Therefore, in embodiments of the present disclosure, when the terminal is in a state of large load and high power consumption, the terminal is charged by the FFC and detects the real-time charging current, and adjusts the charging mode according to the real-time charging current. Specifically, the terminal can obtain the target voltage for charging adjustment according to the real-time charging current, and then perform charging according to the target voltage, thereby effectively solving the overvoltage damage of the battery when the terminal is in a state of large load and high power consumption, and increasing the service time of the terminal.

Embodiments of the present disclosure provide a computer readable storage medium having a program stored thereon. When the program is implemented by the processor, the method according to any of embodiments 1-3 is implemented.

Specifically, the program instruction corresponding to a charging adjustment method in the embodiment may be stored on a storage medium such as an optical disk, a hard disk, a USB, or the like, and when the program instruction corresponding to the charging adjustment method in the storage medium is read or executed by the electronic device, the program instruction includes the following acts:

detecting a real-time charging current when performing flash fast charging FFC;

determining whether to perform a charging adjustment according to the real-time charging current and a preset cut-off current;

obtaining a target voltage when determining to perform the charging adjustment; and performing charging according to the target voltage.

Those skilled in the art will appreciate that embodiments of the present disclosure may be provided as the method, system, or computer program product. Accordingly, the present disclosure may take the form of a hardware embodiment, a software embodiment, or an embodiment in combination with software and hardware. Moreover, the present disclosure may take the form of a computer program product embodied on one or more computer-usable storage medium (including but not limited to disk storage and optical storage) including computer usable program codes.

The present disclosure is described with reference to a flow diagram and/or block diagram of implementing a method, apparatus (system), and computer program product according to embodiments of the present disclosure. It will be understood that each flow and/or block of the flow diagrams and/or block diagrams, and combinations of flow and/or blocks in the flow diagrams and/or block diagrams may be implemented by computer program instructions. These computer program instructions may be provided to a processor of a general purpose computer, special purpose computer, embedded processor, or other programmable data processing device to produce a machine, such that instructions executed by the processor of the computer or other programmable data processing device generate means for implementing the functions specified in one or more processes and/or one block of the block diagrams or a plurality of blocks of a flow diagram.

The computer program instructions may also be stored in a computer readable memory that can direct a computer or other programmable data processing device to operate in a particular manner, such that the instructions stored in the computer readable memory produce a manufacture article including the instruction device. The instruction device implements the functions specified in one or more processes and/or one block of the block diagrams or a plurality of blocks of a flow diagram.

These computer program instructions may also be loaded onto a computer or other programmable data processing device, such that a series of operational steps are performed on a computer or other programmable device to produce computer-implemented processing for execution on a computer or other programmable device. The instructions provide steps for implementing the functions specified in one or more processes and/or one block of the block diagrams or a plurality of blocks of a flow diagram.

The above is only the preferred embodiment of the present disclosure and is not intended to limit the scope of the present disclosure.

What is claimed is:

1. A method for charging adjustment, comprising:
   detecting a real-time charging current when performing charging to a battery;
   determining whether to perform an adjustment for charging mode according to the real-time charging current and a preset cut-off current, wherein the adjustment for charging mode includes an adjustment from a flash fast charging (FFC) method to a method for charging according to a target voltage;
   obtaining the target voltage when determining that the charging adjustment is required; and
   performing charging to the battery according to the target voltage,
   wherein determining whether to perform the adjustment for charging mode according to the real-time charging current and the preset cut-off current comprises:
      determining to perform the adjustment for charging mode when the preset cut-off current is greater than the real-time charging current; and
      determining not to perform the adjustment for charging mode when the preset cut-off current is less than or equal to the real-time charging current.

2. The method according to claim 1, wherein obtaining the target voltage, comprises:
   adjusting a preset cut-off voltage according to the real-time charging current, to obtain the target voltage.

3. The method according to claim 1, wherein obtaining the target voltage, comprises:
   performing a difference calculation on the preset cut-off current and the real-time charging current to obtain a difference result; and
   determining the target voltage according to the difference result and a preset voltage difference range.

4. The method according to claim 3, wherein determining the target voltage according to the difference result and the preset voltage difference range, comprises:

determining a voltage adjustment parameter according to the difference result and the preset voltage difference range; and determining the target voltage according to a preset cut-off voltage and the voltage adjustment parameter.

5. The method according to claim 3, further comprising:

after performing the difference calculation on the preset cut-off current and the real-time charging current to obtain the difference result, determining the target voltage according to a preset standard charging mode, when the difference result is greater than a preset difference threshold, the preset standard charging mode being a charging mode in which constant voltage charging is performed with a fixed rated voltage, and the target voltage being the rated voltage.

6. The method according to claim 1, further comprising:

after performing charging according to the target voltage:

continuing to detect the charging current in real time to reobtain the real-time charging current; and performing the charging adjustment again according to the real-time charging current until the charging is over.

7. A terminal, comprising:

a battery;

a processor; and a memory, configured to store instructions executable by the processor, wherein the processor is configured to run a program corresponding to the instructions by reading the instructions stored in the memory, so as to:

detect a real-time charging current when performing charging to the battery;

determine whether to perform an adjustment for charging mode according to the real-time charging current and a preset cut-off current, wherein the adjustment for charging mode includes an adjustment from a flash fast charging (FFC) method to a method for charging according to a target voltage;

obtain the target voltage when the charging adjustment is determined to be performed; and perform charging to the battery according to the target voltage, wherein a determination to perform the adjustment for charging mode is made when the preset cut-off current is greater than the real-time charging current, and a determination not to perform the adjustment for charging mode is made when the preset cut-off current is less than or equal to the real-time charging current.

8. The terminal according to claim 7, wherein the processor is configured to adjust a preset cut-off voltage according to the real-time charging current, to obtain the target voltage.

9. The terminal according to claim 7, wherein the processor is configured to perform a difference calculation on the preset cut-off current and the real-time charging current to obtain a difference result, and determine the target voltage according to the difference result and a preset voltage difference range.

10. The terminal according to claim 9, wherein the processor is configured to determine a voltage adjustment parameter according to the difference result and the preset voltage difference range, and determine the target voltage according to a preset cut-off voltage and the voltage adjustment parameter.

11. The terminal according to claim 9, wherein after performing the difference calculation on the preset cut-off current and the real-time charging current to obtain the difference result, the processor is further configured to determine the target voltage according to a preset standard charging mode, the preset standard charging mode being a charging mode in which constant voltage charging is performed with a fixed rated voltage, and the target voltage being the rated voltage.

12. The terminal according to claim 7, wherein the processor is further configured to continue to detect the charging current in real time after performing charging according to the target voltage, to reobtain the real-time charging current; and perform the charging adjustment again according to the real-time charging current until the charging is over.

13. A non-transitory computer readable storage medium having a program stored thereon, wherein the program is applied to a terminal, and when the program is executed by a processor, a method for charging adjustment is implemented, the method comprising:

detecting a real-time charging current when performing charging to a battery;

determining whether to perform an adjustment for charging mode according to the real-time charging current and a preset cut-off current, wherein the adjustment for charging mode includes an adjustment from a flash fast charging (FFC) method to a method for charging according to a target voltage;

obtaining the target voltage when determining that the charging adjustment is required; and performing charging to the battery according to the target voltage, wherein determining whether to perform the adjustment for charging mode according to the real-time charging current and the preset cut-off current comprises:

determining to perform the adjustment for charging mode when the preset cut-off current is greater than the real-time charging current; and determining not to perform the adjustment for charging mode when the preset cut-off current is less than or equal to the real-time charging current.

* * * * *